United States Patent
Ichikawa et al.

(10) Patent No.: US 7,381,754 B2
(45) Date of Patent: Jun. 3, 2008

(54) OIL-BASED INK COMPOSITION AND USES THEREOF

(75) Inventors: Shuuji Ichikawa, Yokohama (JP); Takayuki Ikai, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 69 days.

(21) Appl. No.: 10/197,888

(22) Filed: Jul. 19, 2002

(65) Prior Publication Data

US 2003/0134937 A1 Jul. 17, 2003

(30) Foreign Application Priority Data

Jul. 31, 2001 (JP) ............... 2001-232388

(51) Int. Cl.
*C09D 11/00* (2006.01)
(52) U.S. Cl. ..................... 523/160; 523/161
(58) Field of Classification Search ............. 523/160, 523/161; 106/31.27, 31.28, 31.6, 31.43; 524/158, 160, 593
See application file for complete search history.

(56) References Cited

U.S. PATENT DOCUMENTS

| | | | | | |
|---|---|---|---|---|---|
| 2,567,965 | A | * | 9/1951 | Petke | 524/87 |
| 4,761,180 | A | * | 8/1988 | Askeland et al. | 106/31.32 |
| 5,182,324 | A | * | 1/1993 | Osada et al. | 524/379 |
| 5,868,511 | A | * | 2/1999 | Osada | 401/209 |
| 5,969,005 | A | * | 10/1999 | Yamashita et al. | 523/161 |
| 6,479,568 | B1 | * | 11/2002 | Fujii et al. | 523/161 |
| 6,562,116 | B1 | * | 5/2003 | Satoh | 106/31.58 |
| 6,610,133 | B2 | * | 8/2003 | Campbell | 106/31.86 |
| 6,616,741 | B1 | * | 9/2003 | Sawa et al. | 106/31.68 |
| 6,648,951 | B2 | * | 11/2003 | Chen et al. | 106/31.47 |
| 6,655,867 | B2 | * | 12/2003 | Omatsu et al. | 401/142 |
| 7,071,245 | B2 | * | 7/2006 | Ichikawa | 523/161 |
| 2003/0045607 | A1 | * | 3/2003 | Ichikawa | 523/160 |

FOREIGN PATENT DOCUMENTS

EP 262821 A2 * 4/1988
JP 2001-152069 6/2001

OTHER PUBLICATIONS

Aldrich Catalog 1998-1999 (p. 733).*

* cited by examiner

*Primary Examiner*—Edward J. Cain
(74) *Attorney, Agent, or Firm*—Foley & Lardner LLP

(57) ABSTRACT

An ink composition comprising at least one dye represented by one of the following chemical structural formulae and an anthraquinone-based pigment as coloring materials, an alcohol or an ether as a solvent, and a resin. In a preferred embodiment, a triarylmethane-based dye is used in combination or polyvinylbutyral is contained as the resin.

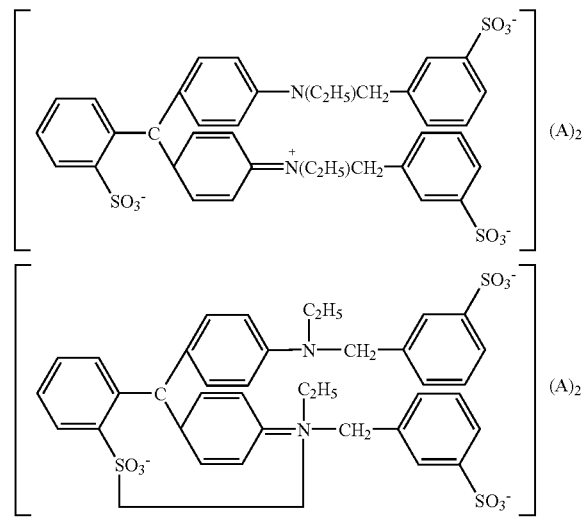

wherein A is a tertiary or quaternary ammonium ion group.

22 Claims, No Drawings

OIL-BASED INK COMPOSITION AND USES THEREOF

TECHNICAL FIELD

The present invention relates to an ink composition and uses thereof. More specifically, the present invention relates to an ink composition suitable as an ink composition for writing instruments and having excellent properties in the dye solubility in the ink or in the compatibility with other raw materials, and also relates to an oil-based sign pen, an oil-based ink stamp pad and an oil-based ballpoint pen using this ink composition.

BACKGROUND ART

The oil-based blue inks heretofore used comprise predominantly a metal complex salt dye in view of hue and durability. In particular, a copper phthalocyanine-based dye is almost an essential component as a metal complex salt dye. However, the metal complex salt dye has a problem in the solubility in an oily solvent. Furthermore, use of a metal complex salt dye alone is disadvantageous in that the concealing property is low. Accordingly, in the case of using the metal complex salt dye, a triarylmethane-based dye of giving good coloration is used in combination in many cases to adjust the hue. As such, in the ink compositions, the metal complex salt dye is used by mixing it with various other raw materials or a solvent. However, the metal complex salt dye is poor in solubility, and particularly in compatibility, and, depending on the solvent or raw materials used and the amount added thereof, there arise troubles, such as an extreme increase in the ink viscosity or generation of precipitates.

In some cases, a pigment dispersion is used in place of the metal complex salt dye so as to impart durability. However, the pigment originally has no solubility and no compatibility and, therefore, when the pigment is used in combination with other materials, there often arise troubles such as thickening or generation of precipitates, similar to the case of using a metal complex salt dye.

By taking account of the above-described problems in conventional techniques, the object of the present invention is to provide an oil-based ink composition which, on use of a non-aqueous (oily) solvent over a wide range, particularly an alcohol such as an alcohol having 2 or more carbon atoms or a polyhydric alcohol, or an ether represented by glycol ether, enables addition of a blue-type dye to a high concentration to overcome those problems encountered under high-concentration conditions, and exhibits good compatibility with other raw materials in the ink and excellent low-temperature aging stability. Also, the object of the present invention is to prevent occurrence of decoloration by alcohols.

SUMMARY OF THE INVENTION

The present invention provides a blue-type dye having high solubility in various non-aqueous (oily) solvents over a wide range, particularly spirit solvents (e.g., alcohol, ether), exhibiting excellent compatibility with other materials, and giving a desired color tone. The above-described problems are overcome by using this dye in combination with an anthraquinone-based pigment. Thus, the present invention provides the following:

(1) An ink composition comprising at least one dye represented by the following chemical structural formula 1 or 2 and an anthraquinone-based pigment as coloring materials, an alcohol or an ether as a solvent, and a resin:

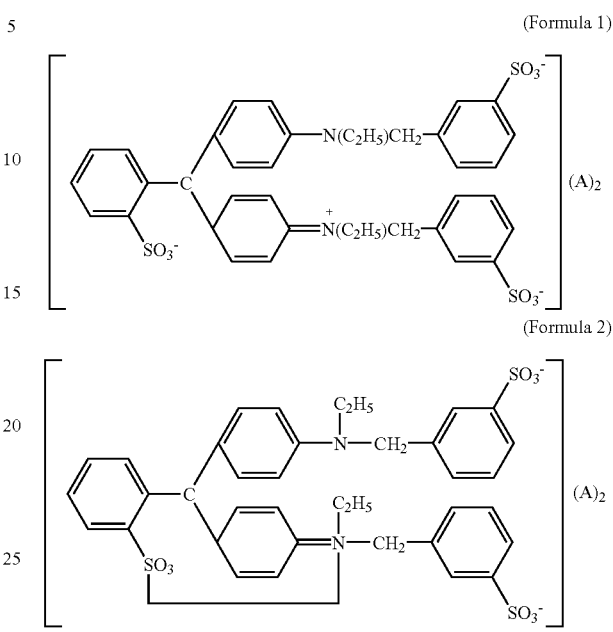

wherein A may be the same or different and is a tertiary or quaternary ammonium ion group.

(2) The ink composition as described in (1), wherein the solvent is a solvent selected from an aliphatic alcohol having 2 or more carbon atoms, a polyhydric alcohol and a glycol ether.

(3) The ink composition as described in (1) and (2), wherein the dye is a dye in which A of chemical structural formula 1 or 2 is a quaternary ammonium ion group and which dissolves in the alcohol or ether used as the solvent, to a concentration of at least 20 mass%.

(4) The ink composition as described in (1) and (2), which uses a triarylmethane-based dye in combination.

(5) The ink composition as described in (1) to (4), which contains a polyvinylbutyral as the resin.

(6) The ink composition as described in (2) to (5), wherein the aliphatic solvent selected from an aliphatic alcohol having 2 or more carbon atoms, a polyhydric alcohol and a glycol ether occupies 40 mass% or more of the entire solvent in the ink composition.

(7) An oil-based sign pen, an oil-based ink stamp pad and an oil-based ballpoint pen each using the ink composition described in (1) to (6).

MODES FOR CARRYING OUT THE INVENTION

The dye for use in the composition of the present invention is a dye comprising a compound represented by chemical structural formula 1 or 2.

The compound represented by the following chemical structural formula 3 is Acid Dye FD & C Blue No. 1, C.I. 42090, Food Blue 2, 3844-45-9, which is known and commercially available. The compound represented by the following chemical structural formula 4 is Acid Dye D & C Blue No. 4, C.I. 42090, Acid Blue 9, 2650-18-2, which is known and commercially available. The compound represented by chemical structural formula 3 or 4 is a sodium salt or an ammonium salt, however, the compound may be purchased in another salt form or converted into other salt form and used as a starting compound.

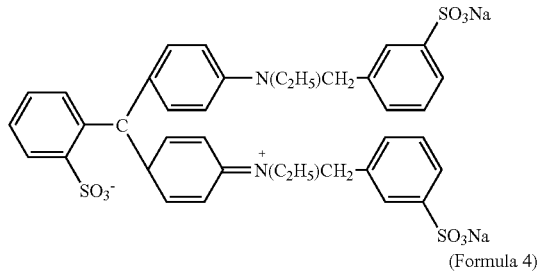
(Formula 3)

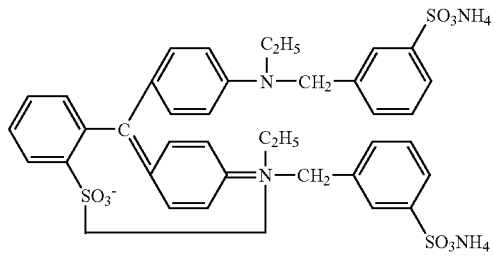
(Formula 4)

According to the present invention, it has been found that the dyes represented by chemical structural formulae 1 and 2 have a desired sky blue-type color hue of the dye represented by chemical structural formula 3 or 4, therefore, can be used as a blue pigment in place of a blue-type metal complex salt dye including a copper phthalocyanine dye. Moreover, these dyes have no problem in the solubility and compatibility unlike a metal complex salt dye, so that an oil-based ink composition having new characteristics and properties which cannot be attained by the metal complex salt dye, can be constructed.

The dye represented by chemical structural formula 1 or 2 for use in the present invention can be produced by converting a compound represented by chemical structural formula 3 or 4, which is a water-soluble sulfonate, or a salt other than these, into a tertiary or quaternary ammonium salt to form a hydrophobic salt (salt formation).

With respect to the component of supplying a tertiary or quaternary ammonium ion group for the oil-soluble salt formation of a dye, a tertiary amine or a tertiary or quaternary ammonium salt or others is used, because if a tertiary or quaternary ammonium group is supplied, the salt formation product can have oil solubility (hydrophobicity) and can be separated by the salt formation. Representative examples thereof include various alkanolamines, alkylamines and ammonium salts. Other than these, compounds which are an amine component and do not adversely affect the affinity of the salt-formed dye in the used solvent may be used. A compound represented by the formula NR$_4$ (wherein R is a chemical species composed of a saturated hydrocarbon or the like with the side chain or the like being substituted or not substituted by a hydroxyl group, an alkyl group, an aryl group or a halogen group; in particular, for rendering the dye hydrophobic in view of chemical structure, a chemical species having a large size in the chemical structure or increased in the ratio or size of a hydrophobic group and thereby facilitated in forming a steric hindrance is preferred) can be used. In view of the object of the present invention, the hydrophobicity is preferably high and for attaining a large effect, it is preferred that the amine component has many organic groups (tertiary, quaternary) and the group has a large number of carbon atoms. From the standpoint of practical utility, a long chain alkyl ammonium salt containing an alkyl group having from 6 to 20 carbon atoms, particularly a quaternary ammonium salt having one or more long chain alkyl group having from 6 to 20 carbon atoms, is preferred.

An example of the quaternary ammonium salt which can be particularly suitably used is shown below.

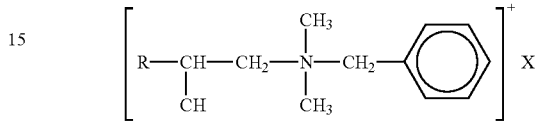

wherein R is an alkyl group having from 6 to 18 carbon atoms and X is a counter ion such as chloride ion. R is preferably, for example, $C_{16}H_{33}$, $C_{12}H_{25}$, $C_{10}H_{21}$, $C_{14}H_{29}$ or $C_8H_2$.

The salt formation may be performed by an ordinary method. Typically, a water-soluble dye represented by chemical structural formula 3 or 4 or a salt analogous thereto is dissolved in heated water and thereto, a salt-forming component such as amine is added while stirring to form a salt. In the reverse thereto, it may also be possible to dissolve a salt-forming component in heated water and add thereto the above-described water-soluble dye to form a salt. The particular conditions such as reaction temperature, pH at the reaction and pH at the completion of reaction, are appropriately determined according to the objective salt-formed dye. For recovering the salt formation product from water and purifying it, various methods such as filtration, salting out, solvent extraction and the addition of a poor solvent, may be used individually or in combination.

By adding one or more of the thus-obtained salt-formed dyes increased in the hydrophobicity, a highly stable oil-based ink composition having a blue color tone and capable of taking the place of the metal complex salt dye, particularly copper phthalocyanine, can be obtained. This salt-formed dye itself can dissolve to a high concentration to constitute an oil-based ink composition and therefore, can be fundamentally used as an excellent ink composition having high concealing property even without using a metal complex salt dye or a pigment dispersion. Not only can this salt-formed dye itself dissolve in an oily solvent to a high concentration but also this dye can be stably present in mixture with a metal complex salt dye or a pigment dispersion. Therefore, not only the concealing property or color hue can be adjusted by the combined use with a metal complex salt dye or a pigment dispersion but also the amount of particularly a metal complex salt dye or a pigment used can be reduced, so that an ink composition having both high durability and a high concealing property can be constructed. Furthermore, the salt-formed dye has excellent compatibility with other material components and, therefore, even if the amount of a metal complex salt dye or a pigment used is reduced and other components are added, there is provided an effect of maintaining the stability of the solution. In particular, the effect of keeping the ink composition stable even if a trimethanol-based dye is used in combination while using a metal complex salt dye or a pigment, is important.

Furthermore, the ink composition of the present invention is characterized by using an anthraquinone-based pigment in combination with the above-described spirit-soluble salt-formed blue dye. The anthraquinone-based pigment has excellent durability and therefore, when an anthraquinone-based pigment is used, durability can be imparted to ink without using a metal complex salt dye. As for the color tone, a blue color, which has heretofore relied on the metal complex salt dye, can be obtained by the salt-formed dye represented by chemical structural formula 1 or 2 of the present invention. Therefore, by using an anthraquinone-based pigment and omitting or reducing a metal complex salt dye, various materials which cannot be used when using a metal complex salt dye, because of a lack of compatibility with the metal complex salt dye, can be used. Examples of these materials include a triphenylmethane-based dye. The triphenylmethane-based dye is roughly classified into a malachite green-type diamino dye, a magenta-type triamino dye and a rosolic acid-based oxy-fuchsone dye. Examples of the diamino dye include Malachite Green, Brilliant Green and Diamond Green. Examples of the triamino dye include Magenta, Methyl Violet, Crystal Violet, Victoria Blue B and Victoria Pure Blue BO. Examples of the oxy-fuchsone dye include Chromaxone Violet RS. Other than these, a xanthene dye and a phthalein dye may be used and examples thereof include resorcin phthaleins represented by oxy.triphenylmethane derivative-type fluorescein, pyrogallol-phthaleins represented by gallein, m-aminophenol.phthaleins represented by aminotriphenylmethane derivative-type Rhodamine, and oxyaminotriphenylmethane derivatives. The present invention is not limited thereto and these materials including salt-formed dyes using these as a skeleton can be freely used in combination and this provides an effect that a desired composition can be constructed without limit.

The blended amount of the dye represented by chemical structural formula 1 or 2 can generally be, but is not limited to, from 0.5 to 30 mass % and this varies depending on the product using the ink composition. For example, the blended amount is generally from 0.5 to 15 mass% in the case of an oil-based sign pen, and from 0.5 to 30 mass % in the case of an oil-based ballpoint pen or an oil-based ink stamp pad.

For the purpose of improving the solubility and compatibility of the composition of the present invention, the dye represented by chemical structural formula 1 or 2 for use in the present invention preferably dissolves in an alcohol or an ether as a solvent, to a concentration of 20 mass % or more, more preferably 30 mass % or more. This is because as the solubility of the dye becomes higher, the stability of the ink composition is elevated. Of course, the solubility of the dye depends on the kind of the solvent used. In the present invention, it will suffice if the above-described solubility can be attained by the combination of a dye and/or a solvent.

Examples of the trimethanol-based dye which can be advantageously used in combination in the present invention include Basic Violet-type dyes and salt-formed dyes having a Basic Blue (e.g., Victoria Blue)-type skeleton. These dyes are necessary as a blue color or an indigo color so as to control the color tone and improve the concealing property of the ink.

As for the coloring agent other than the salt-formed dye represented by chemical structural formula 1 or 2 for use in the oil-based ink composition of the present invention, a dye or a pigment other than the salt-formed dye can be used.

The dye may be freely selected from the dyes used in normal dye ink compositions, such as direct dye, acid dye, basic dye, mordant-acidic mordant dye, spirit-soluble dye, azoic dye, sulfur-sulfur vat dye, vat dye, disperse dye, oil-soluble dye, food dye and, if it has no problem in compatibility, a metal complex salt dye, and inorganic and organic pigments used in normal pigment ink compositions. The amount blended thereof is from 1 to 50 mass% based on the entire amount of the composition.

As described above, another characteristic feature of the present invention is to use an anthraquinone-based pigment in combination. The anthraquinone-based pigment is a pigment having anthraquinone in the chemical structure and the color hue thereof includes red, yellow and blue. The anthraquinone-based pigment used may be a red or yellow pigment, however, as the anthraquinone-based pigment has been developed for the purpose of preparing a blue-type ink, a blue pigment, in particular, C.I. Pigment Blue 60 is most preferred. The average particle size thereof depends on the solvent used or the dispersed state but the pigment preferably has an average particle size of 30 to 700 nm after the dispersion. The pigment can be added, for example, in the range from 0.5 to 25 mass %, preferably from 0.5 to 20 mass %, based on the entire amount of the ink composition.

Other usable pigments can be used individually or in combination of two or more thereof. If desired, a dispersion using an inorganic pigment, a dye or the like may also be added within the range of not adversely affecting the dispersion stability. In addition, a resin emulsion obtained by polymerizing styrene, acrylic acid, acrylic acid ester, methacrylic acid, methacrylic acid ester, acrylonitrile or an olefin-based monomer, an emulsion of a hollow resin which swells in ink to become amorphous, and an organic multicolor pigment comprising a dyed resin particle obtained by dyeing the above-described emulsion itself with a coloring agent, may also be used.

The coloring material for use in the ink composition of the present invention contains an anthraquinone-based pigment. Various other pigments can also be used in the coloring material of the ink composition of the present invention. In the case of using such a pigment, a dispersant can be selected from resins which can dissolve the pigment and such a resin may be selected from resins represented by ketone resin, styrene resin, styrene-acrylic resin, terpene phenol resin, rosin-modified maleic acid resin, rosin phenol resin, alkylphenol resin, phenol-based resin, styrene maleic acid resin, rosin-based resin, acryl-based resin, urea aldehyde-based resin, maleic acid-based resin, cyclohexanone-based resin, polyvinylbutyral and polyvinylpyrrolidone. The dispersant is not limited in kind and may be an activator or an oligomer insofar as it can satisfy the purpose. Specific examples of the dispersant include synthetic resins such as polyvinyl alcohol, polyvinylpyrrolidone, polyvinylbutyral, polyvinyl ether, styrene-maleic acid copolymer, ketone resin, hydroxyethyl cellulose or a derivative thereof, and styrene-acrylic acid copolymer; PO-EO (propylene oxide-ethyrene oxide) adducts; and amine-based oligomers of polyester.

For producing a pigment dispersed ink composition containing a pigment as a coloring material for use in the present invention, various conventionally-known methods can be used. For example, the composition can be easily obtained by blending respective components described above and mixing and stirring the blend with a stirrer such as dissolver, or by mixing and pulverizing the blend by a ball mill, a roll mill, a bead mill, a sand mill, a pin mill or the like, and then centrifuging or filtering the mixture to remove coarse pigment particles, non-dissolved materials and mingled solid matters.

The solvent for use in the composition of the present invention is an alcohol or an ether but is preferably a solvent having a hydroxyl group selected from an aliphatic alcohol having 2 or more carbon atoms, a polyhydric alcohol and a glycol ether.

As for alcohols, specific examples of the aliphatic alcohol having two or more carbon atoms include ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methylamyl alcohol, 2-ethyl butanol, n-heptanol, 2-heptanol, 3-heptanol, n-octanol, 2-octanol, 2-ethyl hexanol, 3,5,5-trimethyl hexanol, nonanol, n-decanol, undecanol, trimethylnonyl alcohol, tetradecanol, heptadecanol, cyclohexanol, 2-methylcyclohexanol, benzyl alcohol and other various higher alcohols.

Specific examples of the polyhydric alcohol include polyhydric alcohols containing 2 or more carbon atoms and 2 or more hydroxyl groups within the molecule, such as ethylene glycol, diethylene glycol, 3-methyl-1,3-butanediol, triethylene glycol, dipropylene glycol, 1,3-propanediol, 1,3-butanediol, 1,5-pentanediol, hexylene glycol and octylene glycol.

Specific examples of the ether include methyl isopropyl ether, ethyl ether, ethyl propyl ether, ethyl butyl ether, isopropyl ether, butyl ether, hexyl ether and 2-ethylhexyl ether. In addition, specific examples of the glycol ether include ethylene glycol monohexyl ether, ethylene glycol monophenyl ether, ethylene glycol mono-2-ethylbutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol phenyl ether, propylene glycol tertiary butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether and tetrapropylene glycol monobutyl ether.

Among these solvents, preferred are glycol ethers having from 2 to 7 carbon atoms because of their clear effect. In view of safety, peroral toxicity or the like, an organic solvent other than ethylene glycol derivatives is preferably used.

Examples thereof include polyhydric alcohol derivatives, sorbitan fatty acid derivatives, polyglycerin higher fatty acid derivatives, sucrose fatty acid derivatives and propylene glycol fatty acid derivatives.

Examples of esters as the solvent include various esters such as propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethSylacetate, ethyl trimethylacetate, propyl trimethylacetate, methyl caproate, ethyl caproate, propyl caproate, methyl caprylate, ethyl caprylate, propyl caprylate, methyl laurate, ethyl laurate, methyl oleate, ethyl oleate, caprylic acid triglyceride, citric acid tributylacetate, octyl oxystearate, propylene glycol monoricinolate, methyl 2-hydroxyisobutyrate and 3-methoxybutyl acetate.

Specific examples of the solvent diether or diester having no hydroxyl group within the molecule include ethylene glycol diethyl ether, ethylene glycol dibutyl ether, diethylene glycol diethyl ether, diethylene glycol dibutyl ether, diethylene glycol dimethyl ether and dipropylene glycol dimethyl ether.

The dye represented by formula 1 or 2 is a dye developed for the purpose of using it particularly in an aliphatic solvent and if a large amount of a solvent component having an aromatic ring is present in a solvent, the salt-formed dye peculiarly advantageous to an aliphatic solvent may show a solubility different from that in a normal aliphatic solvent. In such a case, the amount of the aromatic solvent is preferably limited. More specifically, the aliphatic solvent component is preferably used in an amount of 40 mass % or more based on the entire solvent of the ink composition.

Examples of the resin for use in the oil-based ink composition for ballpoint pens of the present invention include resins which can be used also as a dispersant of pigment, represented by ketone resin, styrene resin, styrene-acrylic resin, terpene phenol resin, rosin-modified maleic acid resin, rosin phenol resin, alkylphenol resin, phenol-based resin, styrene maleic acid resin, rosin-based resin, acryl-based resin, urea aldehyde-based resin, maleic acid-based resin, cyclohexanone-based resin, polyvinylbutyral and polyvinylpyrrolidone.

Here, the polyvinylbutyral resin is used, in addition to use as a dispersant of a pigment, as an additive resin, in many cases, because of a strong activity for film formation of the drawn line and thickening of the ink. However, the dissolved state of the polyvinylbutyral resin in a solvent is greatly governed by an acid-based component in the solvent in many cases and therefore, the species of starting materials used must be carefully selected. Particularly on use of a salt-formed dye, the stability region of ink may greatly differ. Therefore, when using polyvinylbutyral, a dye having higher stability must be used. Moreover, in the case of a dye ink, a copper phthalocyanine-based salt-formed dye is usually an essential component (in the present invention, this may be replaced by an anthraquinone pigment) and therefore, a dye having higher stability in the compatibility between dyes and with starting materials is demanded. The amount of the resin including polyvinylbutyral is preferably from 1 to 30 mass %, more preferably from 1 to 20 mass %. If the amount incorporated is less than 1 mass %, there arises difficulty in the control of viscosity or in the abrasion at the pen tip, whereas if it exceeds 30 mass %, the starting materials other than the resin cannot be blended or the writing is adversely affected.

In the present invention, if desired, a rust preventive, an antifungal, a surfactant, a lubricant, a wetting agent and the like, which can be compatibilized without adversely affecting the ink, can be further blended. In particular, a fatty acid and the like can be suitably used as a lubricant. Furthermore, a non-volatile solvent or the like compatible with the main solvent can be blended as an additive for preventing drying, within the range of not adversely affecting the product properties.

According to the oil-based ink composition of the present invention, the problems encountered in use of a metal complex salt dye or a pigment dispersion, that is, although a triarylmethane-based dye having good coloration is used in combination in many cases, troubles are caused in ink depending on the solvent or raw materials used or the amount added thereof, such as extreme increase in the viscosity of ink or generation of precipitates, can be overcome. Also, an oil-based ink composition enabling addition of a blue-type dye to a high concentration on use of an alcohol such as an alcohol having 2 or more carbon atoms or a polyhydric alcohol, or an ether such as glycol ether, having good compatibility with other starting materials in the ink even under high concentration condition, and exhibiting excellent low-temperature aging stability, can be provided. Furthermore, the performance of making the occurrence of decoloration difficult, in relation to alcohols, can be enhanced.

These effects can be attained by an ink composition characterized in that a copper phthalocyanine-based dye or a copper phthalocyanine-based pigment usually used as a blue ink on use of an alcohol, a polyhydric alcohol or a glycol ether is not used but, alternatively, a salt-formed dye represented by chemical structural formula 1 or 2 and an anthraquinone-based pigment dispersion are used. By this construction, stability of ink can be ensured while maintaining the light durability of the anthraquinone-based pigment. As for the concealing property, a Basic Blue-type dye can be used as a triarylmethane-based dye and therefore, the width of color tone or the latitude of blending can be broadened. From these, it is considered that aging stability and compatibility can be more enhanced. As a result, an oil-based ink composition having excellent aging stability even under high concentration conditions or at low temperatures can be provided.

EXAMPLES

The present invention is described in greater detail below by referring to Examples, however, the present invention is not limited to these Examples. In the following Examples and Comparative Examples, the amount of component is in the unit of mass%.

Production of Dye

In 80 g of purified water heated to 90° C., 20 g of a dye represented by chemical structural formula 3 or 4 (Na salt, NH$_4$ salt produced by Kimi Kasei) was dissolved. Thereto, a quaternary ammonium salt having the following chemical structural formula 5:

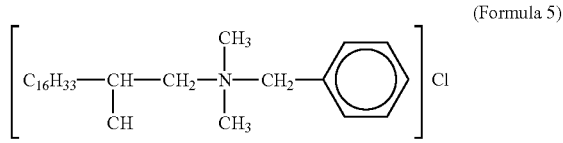

(Formula 5)

was added until the reaction solution reached a pH of 6.0 while stirring, and then the reaction solution was stirred for 30 minutes. The amount added of the quaternary ammonium having chemical structural formula 3 was 20 g. After the completion of stirring, the reaction solution was allowed to cool to room temperature and the precipitated viscous material was separated and deprived of the water content to obtain a salt-formed dye.

The salt-formed dye obtained was a compound represented by the following the chemical structural formula 6 or 7.

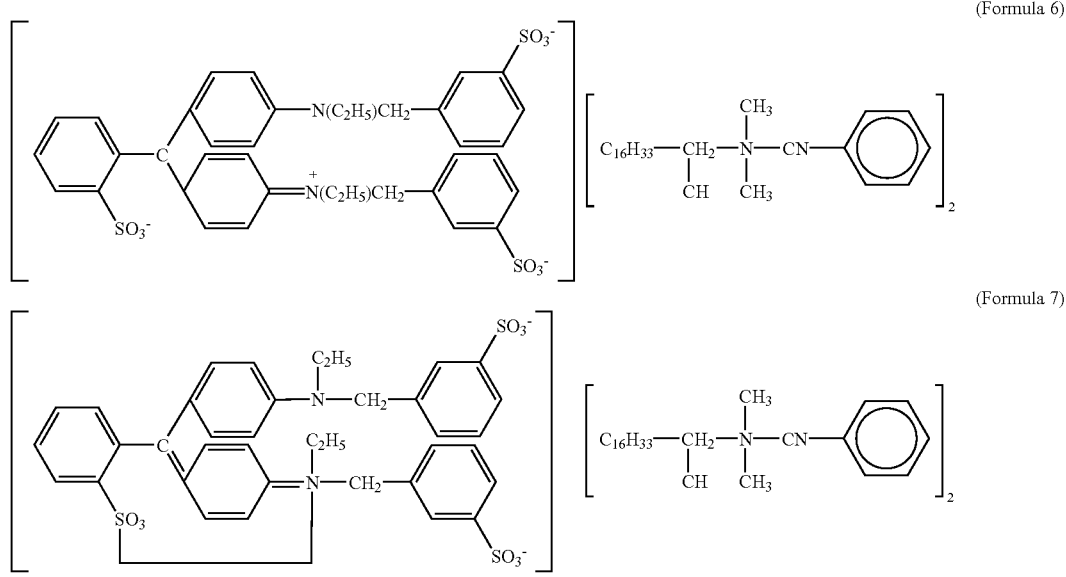

(Formula 6)

(Formula 7)

Production of Ink Composition

Various ink compositions were produced according to the following blending through stirring with a disper or through dispersion with a bead mill or a roll mill.

| Oil-Based Sign Pen Form | |
|---|---|
| (Comparative Example 1) | |
| Spilon Blue 2GNH new [produced by Hodogaya Chemical Co., Ltd.] | 6.0% |
| Eslec B.BL-1 [produced by Sekisui Chemical Co., Ltd.] | 1.5% |
| Markide No. 34 [produced by Arakawa Chemical Ind. Ltd.] | 3.0% |

-continued

| Oil-Based Sign Pen Form | |
|---|---|
| Ethanol | 39.5% |
| Propylene glycol monomethyl ether | 30.0% |
| 3-Methoxy, 1-butanol | 20.0% |
| (Example 1) | |
| CROMOPHTAL Blue A3R [produced by Ciba] | 2.0% |
| Salt formation product of chemical structural formula 6 | 4.0% |
| Eslec B.BM-5 [produced by Sekisui Chemical Co., Ltd.] | 1.0% |
| Markide No. 34 [produced by Arakawa Chemical Ind. Ltd.] | 1.0% |
| Ethanol | 39.5% |
| Propylene glycol monomethyl ether | 32.5% |
| 3-Methoxy, 1-butanol | 20.0% |

Comparative Example 1 was an ink composition for oil-based sign pen, where the sky blue color was entirely formed by a phthalocyanine dye (Spilon Blue 2GNH new). On the other hand, Example 1 was an ink composition for oil-based sign pen, where a phthalocyanine dye was not used at all and a salt-formed dye of the present invention and an anthraquinone-based pigment (CROMOPHTAL Blue A3R) were used. The Eslec series including the following are polyvinylbutyral.

| (Comparative Example 2) | |
|---|---|
| Cyanine Blue ZCA350EP [produced by Dainichi Seika] | 5.0% |
| Eslec B.BL-1 [produced by Sekisui Chemical Co., Ltd.] | 2.0% |
| Ethanol | 50.0% |
| Propylene glycol monomethyl ether | 33.0% |
| Benzyl alcohol | 10.0% |
| (Example 2) | |
| CROMOPHTAL Blue A3R [produced by Ciba] | 2.0% |
| Spilon Violet C-RH [produced by Hodogaya Chemical Co., Ltd.] | 1.0% |
| Salt formation product of chemical structural formula 7 | 2.0% |
| Eslec B.BM-1 [produced by Sekisui Chemical Co., Ltd.] | 1.0% |
| Ethanol | 50.0% |
| Propylene glycol monomethyl ether | 34.0% |
| Benzyl alcohol | 10.0% |

Comparative Example 2 was an ink composition for oil-based sign pen, where the blue color was entirely formed by a phthalocyanine pigment (Cyanine Blue ZCA350EP). On the other hand, Example 2 was an ink composition for oil-based sign pen, where a phthalocyanine pigment was not used and a salt-formed dye of the present invention, an anthraquinone-based pigment (CROMOPHTAL Blue A3R) and a triphenylmethane-based dye (Spilon Violet C-RH) were used.

| (Comparative Example 3) | |
|---|---|
| SPT Blue #26 [produced by Hodogaya Chemical Co., Ltd.] | 5.0% |
| Spilon Blue C-RH | 3.0% |
| Eslec B.BL-S [produced by Sekisui Chemical Co., Ltd.] | 1.5% |
| Ethanol | 40.0% |

-continued

| | |
|---|---|
| Propylene glycol monomethyl ether | 38.5% |
| Benzyl alcohol | 12.0% |
| (Example 3) | |
| CROMOPHTAL Blue A3R [produced by Ciba] | 2.0% |
| Salt formation product of chemical structural formula 6 | 3.0% |
| Salt formation product of C.I. Basic Violet 4 and sodium alkyldiphenyletherdisulfonate | 2.0% |
| Spilon Blue C-RH [produced by Hodogaya Chemical Co., Ltd.] | 1.0% |
| Eslec B.BM-S [produced by Sekisui Chemical Co., Ltd.] | 1.0% |
| YP90L [produced by Yasuhara Chemical] | 1.0% |
| Ethanol | 40.0% |
| Propylene glycol monomethyl ether | 35.0% |
| Benzyl alcohol | 15.0% |

Comparative Example 3 was an ink composition for an oil-based sign pen, where the blue color was formed by a phthalocyanine dye (SPT Blue #26) and a triphenylmethane-based dye (Spilon Blue C-RH). On the other hand, Example 3 was an ink composition for an oil-based sign pen, where a phthalocyanine dye was not used and a salt-formed dye of the present invention, an anthraquinone-based pigment (CROMOPHTAL Blue A3R) and two kinds of triphenylmethane-based dyes (B.V. 4-type, and Spilon Blue C-RH) were used.

| Oil-Based Ink Stamp Pad Form | |
|---|---|
| (Comparative Example 4) | |
| Cyanine Blue ZCA350EP [produced by Dainichi Seika] | 12.0% |
| Eslec B.BM-1 [produced by Sekisui Chemical Co., Ltd.] | 3.0% |
| Polypropylene glycol | 43.0% |
| Dipropylene glycol | 42.0% |
| (Example 4) | |
| CROMOPHTAL Blue A3R [produced by Ciba] | 5.0% |
| Salt formation product of chemical structural formula 7 | 8.0% |
| Eslec B.BM-1 [produced by Sekisui Chemical Co., Ltd.] | 2.0% |
| Propylene glycol | 43.0% |
| Dipropylene glycol | 42.0% |

Comparative Example 4 was an ink composition for an oil-based ink stamp pad, where the blue color was entirely formed by a phthalocyanine pigment. On the other hand, Example 4 was an ink composition for an oil-based ink stamp pad, where a phthalocyanine pigment was not used and a salt-formed dye of the present invention and an anthraquinone-based pigment (CROMOPHTAL Blue A3R) were used.

| (Comparative Example 5) | |
|---|---|
| SPT Blue #26 [produced by Hodogaya Chemical Co., Ltd.] | 10.0% |
| Spilon Blue C-RH | 10.0% |
| Eslec B.BL-S [produced by Sekisui Chemical Co., Ltd.] | 5.0% |
| TAMANOR 531 [produced by Arakawa Chemical Ind. Ltd.] | 4.0% |
| Diglycerin monostearate | 1.0% |

-continued

| | |
|---|---|
| Dipropylene glycol | 25.0% |
| 3-Methoxy, 3-methyl, 1-butanol | 45.0% |
| (Example 5) | |
| CROMOPHTAL Blue A3R [produced by Ciba] | 10.0% |
| Spilon Violet C-RH [produced by Hodogaya Chemical Co., Ltd.] | 2.0% |
| Salt formation product of chemical structural formula 6 | 7.0% |
| Eslec B.BM-S [produced by Sekisui Chemical Co., Ltd.] | 5.0% |
| Diglycerin monostearate | 1.0% |
| Dipropylefle glycol | 20.0% |
| 3-Methoxy, 3-methyl, 1-butanol | 55.0% |

Comparative Example 5 was an ink composition for an oil-based ink stamp pad, where the blue color was formed by a phthalocyanine dye (SPT Blue #26) and a triphenylmethane-based dye (Spilon Blue C-RH). On the other hand, Example 5 was an ink composition for an oil-based ink stamp pad, where a phthalocyanine dye was not used and a salt-formed dye of the present invention, an anthraquinone-based pigment (CROMOPHTAL Blue A3R) and a triphenylmethane-based dye (Spilon Blue C-RH) were used.

| (Comparative Example 6) | |
|---|---|
| Spilon Blue 2GNH new [produced by Hodogaya Chemical Co., Ltd.] | 20.0% |
| Salt formation product of C.I. Basic Violet 4 and C.I. Acid Yellow 36 | 3.0% |
| Eslec B.BL-1 [produced by Sekisui Chemical Co., Ltd.] | 5.0% |
| YP90L [produced by Yasuhara Chemical] | 5.0% |
| 3-Methoxy, 3-methyl, 1-butanol | 52.0% |
| Benzyl alcohol | 15.0% |
| (Example 6) | |
| CROMOPHTAL Blue A3R [produced by Ciba] | 10.0% |
| Salt formation product of chemical structural formula 7 | 12.0% |
| Spilon Violet C-RH [produced by Hodogaya Chemical Co., Ltd.] | 5.0% |
| Spilon Blue C-RH [produced by Hodogaya Chemical Co., Ltd.] | 1.0% |
| Eslec B.BM-1 [produced by Sekisui Chemical Co., Ltd.] | 5.0% |
| 3-Methoxy, 3-methyl, 1-butanol | 52.0% |
| Benzyl alcohol | 15.0% |

Comparative Example 6 was an ink composition for an oil-based ink stamp pad, where a phthalocyanine dye and B.V. 4-type triphenylmethane-based dye (B.V. 4-type salt-formed dye) were contained as the blue color. On the other hand, Example 6 was an ink composition for an oil-based ink stamp pad, where a phthalocyanine dye was not used and a salt-formed dye of the present invention, an anthraquinone-based pigment (CROMOPHTAL Blue A3R) and two kinds of triphenylmethane-based dyes (Spilon Violet C-RH, Spilon Blue C-RH) were contained.

| Oil-Based Ballpoint Pen Form | |
|---|---|
| (Comparative Example 7) | |
| SAVINIL Blue GLS [produced by Clariant] | 25.0% |
| Eslec B.BM-1 [produced by Sekisui Chemical Co., Ltd.] | 5.0% |
| RAROPEARL A101 [produced by BASF] | 5.0% |

-continued

| Oil-Based Ballpoint Pen Form | |
|---|---|
| Dipropylene glycol | 10.0% |
| 3-Methoxy, 3-methyl, 1-butanol | 40.0% |
| Benzyl alcohol | 15.0% |
| (Example 7) | |
| CROMOPHTAL Blue A3R [produced by Ciba] | 7.0% |
| Salt formation product of chemical structural formula 7 | 10.0% |
| Eslec B.BM-1 [produced by Sekisui Chemical Co., Ltd.] | 4.0% |
| RAROPEARL A101 [produced by BASF] | 5.0% |
| Dipropylene glycol | 10.0% |
| 3-Methoxy, 3-methyl, 1-butanol | 49.0% |
| Benzyl alcohol | 15.0% |

Comparative Example 7 was an ink composition for an oil-based ballpoint pen, where the blue color was entirely formed by a phthalocyanine dye (SAVINIL Blue GL). On the other hand, Example 7 was an ink composition for an oil-based ballpoint pen, where a phthalocyanine dye was not used and a salt-formed dye of the present invention and an anthraquinone-based pigment (CROMOPHTAL Blue A3R) were used. The total amount of dye is 25 mass % in Comparative Example 7, whereas the total amount of dyes is as small as 17 mass % in Example 7. This is because the phthalocyanine dye (SAVINIL Blue GL) is thin in the color and therefore, must be used in a large amount, whereas the color of the anthraquinone-based pigment (CROMOPHTAL Blue A3R) is deep (thick). In general, when a phthalocyanine dye is dissolved in a large amount, the ink is deteriorated in stability, however, according to the present invention, a large amount of dye can be stably incorporated to a necessary concentration.

| (Comparative Example 8) | |
|---|---|
| SPT Blue #26 [produced by Hodogaya Chemical Co., Ltd.] | 22.0% |
| Spilon Blue C-RH | 8.0% |
| Eslec B.BM-1 [produced by Sekisui Chemical Co., Ltd.] | 7.0% |
| RAROPEARL A101 [produced by BASF] | 5.0% |
| Dipropylene glycol | 3.0% |
| 3-Methoxy, 1-butanol | 15.0% |
| 3-Methoxy, 3-methyl, 1-butanol | 40.0% |
| (Example 8) | |
| CROMOPHTAL Blue A3R [produced by Ciba] | 8.0% |
| Salt formation product of chemical structural formula 6 | 12.0% |
| Salt formation product of C.I. Basic Violet 4 and sodium alkyldiphenyletherdisulfonate | 8.0% |
| Eslec B.BM-1 [produced by Sekisui Chemical Co., Ltd.] | 7.0% |
| Resin SK [produced by Huels] | 5.0% |
| 3-Methoxy, 3-methyl, 1-butanol | 60.0% |

Comparative Example 8 was an ink composition for an oil-based ballpoint pen, where a phthalocyanine dye (SPT Blue #26) and a triphenylmethane-based dye (Spilon Blue C-RH) were used as the blue color. On the other hand, Example 8 was an ink composition for an oil-based ballpoint pen, where a phthalocyanine dye was not used and a salt-formed dye of the present invention, an anthraquinone-based pigment (CROMOPHTAL Blue A3R) and a triphenylmethane-based dye (B.V. 4-type salt-formed dye) were used.

(Comparative Example 9)

| | |
|---|---|
| SPT Blue #26 [produced by Hodogaya Chemical Co., Ltd.] | 17.0% |
| Spilon Blue C-RH | 10.0% |
| Salt formation product of C. I. Basic Violet 4 and sodium alkylsulfonate | 8.0% |
| Eslec B.BM-1 [produced by Sekisui Chemical Co., Ltd.] | 6.0% |
| YP90L [produced by Yasuhara Chemical] | 5.0% |
| 3-Methoxy, 3-methyl, 1-butanol | 35.0% |
| Benzyl alcohol | 6.0% |
| Diethylene glycol monophenyl ether | 13.0% |

(Example 9)

| | |
|---|---|
| CROMOPHTAL Blue A3R [produced by Ciba] | 7.0% |
| Salt formation product of chemical structural formula 7 | 10.0% |
| Spilon Blue C-RH [produced by Hodogaya Chemical Co., Ltd.] | 3.0% |
| Salt formation product of C.I. Basic Violet 4 and sodium alkylsulfonate | 8.0% |
| Eslec B.BM-1 [produced by Sekisui Chemical Co., Ltd.] | 6.0% |
| YP90L [produced by Yasuhara Chemical] | 5.0% |
| 3-Methoxy, 3-methyl, 1-butanol | 55.0% |
| Benzyl alcohol | 6.0% |

Comparative Example 9 was an ink composition for an oil-based ballpoint pen, where a phthalocyanine dye (SPT Blue #26) having poor compatibility with polyvinylbutyral and a triphenylmethane-based dye (Spilon Blue C-RH) were contained in combination as the blue color. On the other hand, Example 9 was an ink composition for an oil-based ballpoint pen, where a phthalocyanine dye was not used and a salt-formed dye of the present invention, an anthraquinone-based pigment (CROMOPHTAL Blue A3R) and triphenylmethane-based dyes (Spilon Blue C-RH and B.V. 4-type salt-formed dye) were contained.

(Comparative Example 10)

| | |
|---|---|
| Cyanine Blue ZCA350EP [produced by Dainichi Seika] | 25.0% |
| Eslec B.BL-1 [produced by Sekisui Chemical Co., Ltd.] | 3.0% |
| Eslec B.BM-1 [produced by Sekisui Chemical Co., Ltd.] | 2.0% |
| Benzyl alcohol | 15.0% |
| Diethylene glycol monophenyl ether | 55.0% |

(Example 10)

| | |
|---|---|
| CROMOPHTAL Blue A3R [produced by Ciba] | 5.0% |
| Salt formation product of chemical Structural formula 7 | 10.0% |
| Spilon Blue C-RH [produced by Hodogaya Chemical Co., Ltd.] | 10.0% |
| Spilon Violet C-RH [produced by Hodogaya Chemical Co., Ltd.] | 1.0% |
| Eslec B.BL-1 [produced by Sekisui Chemical Co., Ltd.] | 3.0% |
| Eslec B.BM-1 [produced by Sekisui Chemical Co., Ltd.] | 2.0% |
| 3-Methoxy, 3-methyl, 1-butanol | 63.0% |
| Benzyl alcohol | 6.0% |

Comparative Example 10 was an ink composition for an oil-based ballpoint pen, where a phthalocyanine pigment was dispersed using two kinds of polyvinylbutyral resins (BM-1 having a high molecular weight and BL-1 having a low molecular weight). On the other hand, Example 10 was an ink composition for an oil-based ballpoint pen, where a phthalocyanine pigment was not used and a salt-formed dye of the present invention, an anthraquinone-based pigment (CROMOPHTAL Blue A3R) and a triphenylmethane-based dye (Spilon Blue C-RH) were contained using two kinds of resins (BM-1 having a high molecular weight and BL-1 having a low molecular weight).

Ink Evaluation Test

The thus-obtained inks were subjected to an evaluation test as follows.

Evaluation of Low-Temperature Stability of Ink

Into a 20 ml-volume glass bottle, about 15 ml of each ink obtained in Examples and Comparative Examples was charged. After tightly corking, the inks were left standing for one month in a predetermined thermostatic chamber. The flow of ink was observed by a spatula or the like. Furthermore, each product form was prepared and the degradation of the product was observed.

(Oil-Based Sign Pen Form)

Each ink obtained in Examples and Comparative Examples was filled in an appropriate amount into a marking pen using a felt pen tip (Mitsubishi Oil-Based Marker "Peace") and used as a test sample for evaluation.

(Oil-Based Ink Stamp Pad Form)

Each ink obtained in Example 5 and Comparative Example 5 was filled in an appropriate amount into an ink stamp pad using a wool felt and extra fine fibers (Mitsubishi Oil-Based Ink Stamp Pad "HSP-2G") and used as a test sample for evaluation.

The inks of Examples 6 and 7 and Comparative Examples 6 and 7 were low in viscosity and for these inks, a needle felt and plain weave extra fine fibers were used.

(Oil-Based Ballpoint Pen Form)

Each ink obtained in Examples and Comparative Examples was filled in an appropriate amount into a polypropylene tube having an inner diameter of 1.60 mm, the tube was fixed to a stainless steel tip (the ball was made of a super hard alloy and had a diameter of 1.0 mm), and an ink follower was inserted from the rear end, thereby completing a ballpoint pen form. This was used as a test sample for evaluation.

Predetermined thermostatic chamber:

Set to the following two conditions.

1) Thermostatic chamber at constant temperature of 0° C./the low-temperature stability was confirmed.

2) Thermostatic chamber having temperature change of 0° C.→15° C.→30° C.→15° C.→0° C. every 6 hours/the cycle temperature stability was confirmed.

Evaluation Items

1) Low-temperature stability of ink/confirmation of ink flow state in glass bottle ◯: no problem in ink flow; Δ: slightly higher resistance against ink flow than initial state; X: very high resistance against ink flow.

2) Ink cycle temperature stability

◯: nothing on the bottom; Δ: generation of precipitate was perceived; X: there were many precipitates and the generation thereof was clearly confirmed.

3) Deterioration degree of product a) Oil-based sign pen form

Freehand writing (writing of circles) was performed on PPC paper and the degree of "thinning of writing" generated was rated as follows, ○: thinning was hardly generated, Δ: thinning was slightly generated and X: thinning was readily generated.

b) Oil-based ink stamp pad form

The ink of the ink stamp pad was transferred to a rubber stamp and transferred to PPC paper. At this time, the sticking phenomenon (called tack) between the paper and stamp was rated as follows, ○: no tack, Δ: slight tack and X: very clear tack.

c) Oil-based ballpoint pen form

Freehand writing (writing of circles) was performed on PPC paper and the degree of "thinning of writing" generated was rated as follows, ○: thinning was hardly generated, Δ: thinning was slightly generated and X: thinning was readily generated.

4) Alcohol Resistance Test a) Oil-based sign pen form

Freehand writing (writing of circles) was performed on PPC paper and the paper was cut into a size of approximately 70 mm (length)×30 mm (width) to prepare a specimen. About a half portion of this specimen was dipped in ethanol for one day and the blurring degree and legible state of drawn lines was evaluated.

◎: completely no blurring of drawn lines, ○: the drawn lines were blurred but legible, Δ: the drawn lines were severely blurred and not legible and X: the drawn lines disappeared.

b) Oil-Based Ink Stamp Pad Form

The ink of the ink stamp pad was transferred to a rubber stamp of 15 mm (length)×50 mm (width) and sealed on PPC paper to prepare a specimen. About a half portion of this specimen was dipped in ethanol for one day and the blurring degree and legible state of the imprint was evaluated.

◎: completely no blurring of imprint, ○: the seal was blurred but legible, Δ: the imprint was severely blurred and not legible and X: the imprint disappeared.

c) Oil-Based Ballpoint Pen Form

Freehand writing (writing of circles) was performed on PPC paper and the paper was cut into a size of approximately 70 mm (length)×30 mm (width) to prepare a specimen. About a half portion of this specimen was dipped in ethanol for one day and the blurring degree and legible state of drawn lines was evaluated.

◎: completely no blurring of drawn lines, ○: the drawn lines were blurred but legible, Δ: the drawn lines were severely blurred and not legible and X: the drawn lines disappeared.

TABLE 1

| Low-Temperature Aged Sample | Examples | | | | | | | | | |
|---|---|---|---|---|---|---|---|---|---|---|
| | 1 | 2 | 3 | 4 | 5 | 6 | 7 | 8 | 9 | 10 |
| Ink stability at the low-temperature | ○ | ○ | ○ | ○ | ○ | ○ | ○ | ○ | ○ | ○ |
| Ink stability for the cycle | ○ | ○ | ○ | ○ | ○ | ○ | ○ | ○ | ○ | ○ |
| Deterioration degree of product | ○ | ○ | ○ | ○ | ○ | ○ | ○ | ○ | ○ | ○ |
| Resistance against alcohol | ○ | ○ | ○ | ○ | ○ | ○ | ○ | ○ | ○ | ○ |

| Low-Temperature Aged Sample | Comparative Examples | | | | | | | | | |
|---|---|---|---|---|---|---|---|---|---|---|
| | 1 | 2 | 3 | 4 | 5 | 6 | 7 | 8 | 9 | 10 |
| Ink stability at the low-temperature | ○ | Δ | ○ | X | Δ | Δ | X | Δ | Δ | Δ |
| Ink stability for the cycle | ○ | Δ | X | Δ | X | ○ | Δ | X | X | Δ |
| Deterioration degree of product | Δ | X | X | X | X | Δ | X | X | X | X |
| Resistance against alcohol | X | ○ | X | ○ | X | X | X | X | ○ | ○ |

As is apparent from the results in Table 1, it is revealed that the oil-based ink compositions of Examples 1 to 10 within the scope of the present invention are very excellent in regard to the ink low-temperature stability and the deterioration in performance of a product as compared with the oil-based ink composition of Comparative Examples 1 to 10 which are out of the scope of the present invention.

According to the present invention, an oil-based ink composition is provided, which, on use of an alcohol or an ether, enables addition of a blue-type dye to a high concentration overcomes those problems encountered under high-concentration conditions, exhibits good compatibility with other raw materials in ink and excellent low-temperature aging stability, and is difficult to decolorize with alcohols. These performances cannot be attained by conventional oil-based ink compositions.

The invention claimed is:

1. A ballpoint pen ink composition comprising coloring materials, a resin, and a non-aqueous solvent comprising 3-methoxy-3-methyl-1-butanol,
said coloring materials comprising a combination of an anthraquinone-based pigment and at least one dye represented by the following Formulas 1 or 2 and being free of a metal complex salt dye,
said anthraquinone-based pigment having an average particle size of 30-700 nm and occupying 0.5-25 mass % based on the ink composition,
wherein 3-methoxy-3-methyl-1-butanol is 40 mass % or more of the entire solvent,
said dye dissolving in said non-aqueous solvent to a concentration of at least 20 mass %,
said resin comprising polyvinylbutyral:

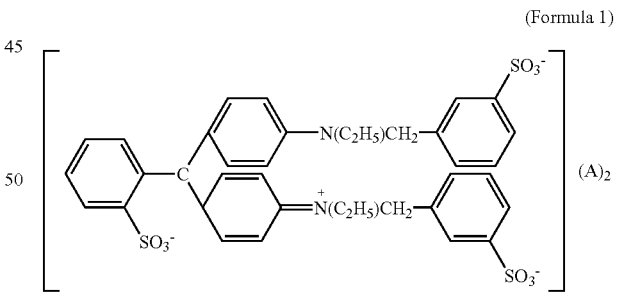
(Formula 1)

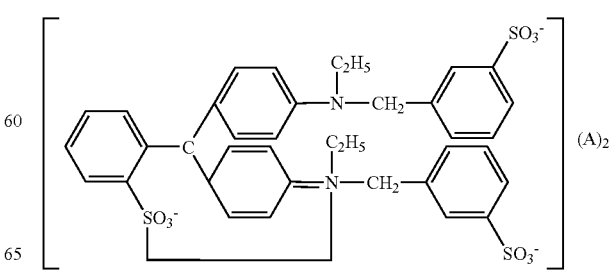
(Formula 2)

wherein A may be the same or different and is a quaternary ammonium ion group having a saturated hydrocarbon group substituted with a hydroxyl group and being sterically hindered, wherein said dye represented by the chemical structural Formula 1 or 2 is compatible with the other ingredients in said ink composition, and said ink composition has a low temperature aging stability.

2. The ballpoint pen ink composition according to claim 1, wherein said coloring materials consist essentially of a combination of an anthraquinone-based pigment and at least one dye represented by Formulas 1 or 2.

3. A ballpoint pen ink composition comprising coloring materials, a resin, and a non-aqueous solvent comprising 3-methoxy-3-methyl-1-butanol, said coloring materials comprising a combination of an anthraquinone-based pigment, at least one dye represented by the following Formulas 1 or 2 and a triphenylmethane-based dye and being free of a metal complex salt dye, wherein 3-methoxy-3-methyl-1-butanol is 40 mass % or more of the entire solvent, said dye represented by the following Formula 1 or 2 dissolving in the non-aqueous solvent to a concentration of at least 30 mass %, said resin comprising polyvinylbutyral:

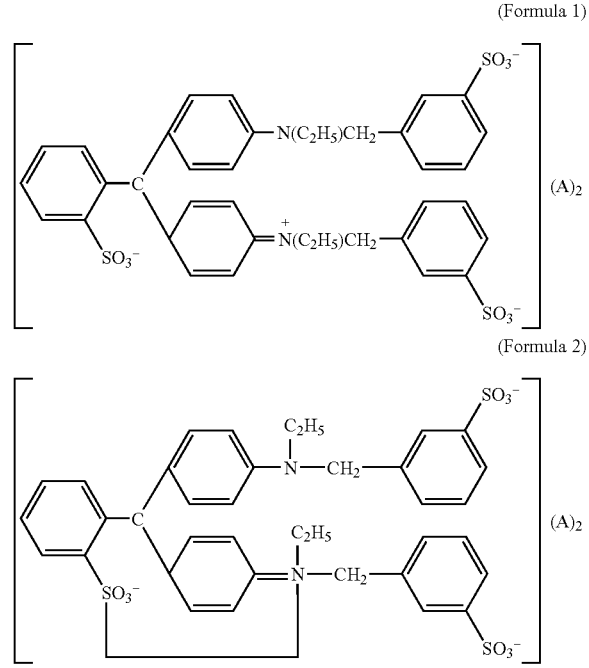

wherein A may be the same or different and is a quaternary ammonium ion group having a saturated hydrocarbon group substituted with a hydroxyl group and being sterically hindered, said dye represented by the chemical structural Formula 1 or 2 is compatible with the other ingredients in said ink composition, and said ink composition has a low temperature aging stability.

4. The ballpoint pen ink composition according to claim 3, wherein said coloring materials consist essentially of a combination of an anthraquinone-based pigment and at least one dye represented by Formulas 1 or 2 and a triphenylmethane-based dye.

5. A ballpoint pen ink composition comprising coloring materials, a resin, and a non-aqueous solvent comprising 3-methoxy-3-methyl-1-butanol, said coloring materials comprising a combination of an anthraquinone-based pigment, at least one dye represented by Formula 1 or 2, a trimethanol-based dye and a metal complex salt dye or pigment, wherein 3-methoxy-3-methyl-1-butanol is 40 mass % or more of the entire solvent, said dye represented by the following Formula 1 or 2 dissolving in the non-aqueous solvent to a concentration of at least 30 mass %, said resin comprising polyvinylbutyral:

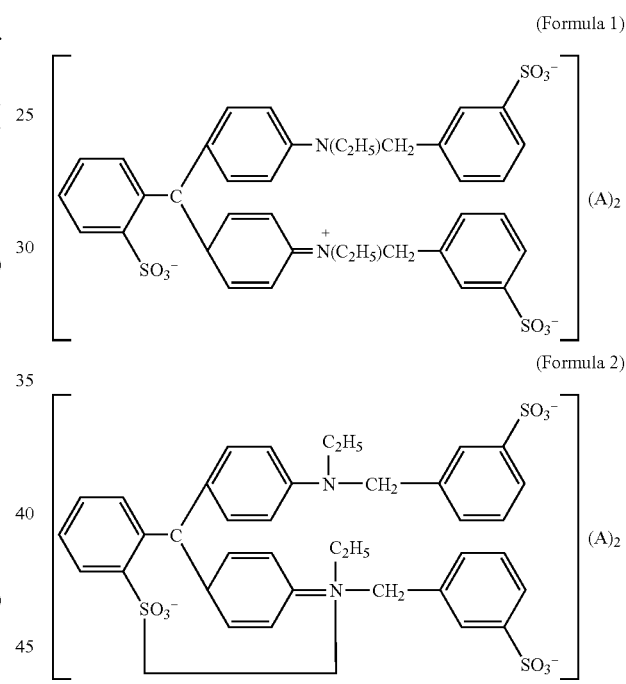

wherein A may be the same or different and is a quaternary ammonium ion group having a saturated hydrocarbon group substituted with a hydroxyl group and being sterically hindered, said dye represented by the chemical structural Formula 1 or 2 is compatible with the other ingredients in said ink composition, and said ink composition has a low temperature aging stability.

6. The ballpoint pen ink composition according to claim 5, wherein said coloring materials consist essentially of a combination of an anthraquinone-based pigment, at least one dye represented by Formula 1 or 2, a triphenylmethane-based dye, a trimethanol-based dye and a metal complex salt dye or pigment.

7. A ballpoint pen ink composition comprising coloring materials, a resin, and a non-aqueous solvent comprising 3-methoxy-3-methyl-1-butanol, said coloring materials comprising a combination of an anthraquinone-based pigment, at least one dye represented by the following Formula 1 or 2, and a xanthene dye and being free of a metal complex salt dye, wherein 3-methoxy-3-methyl-1-butanol is 40 mass% or more of the entire solvent, said dye represented by the following Formula 1 or 2 dissolving in the non-aqueous solvent to a concentration of at least 30 mass %, said resin comprising polyvinylbutyral:

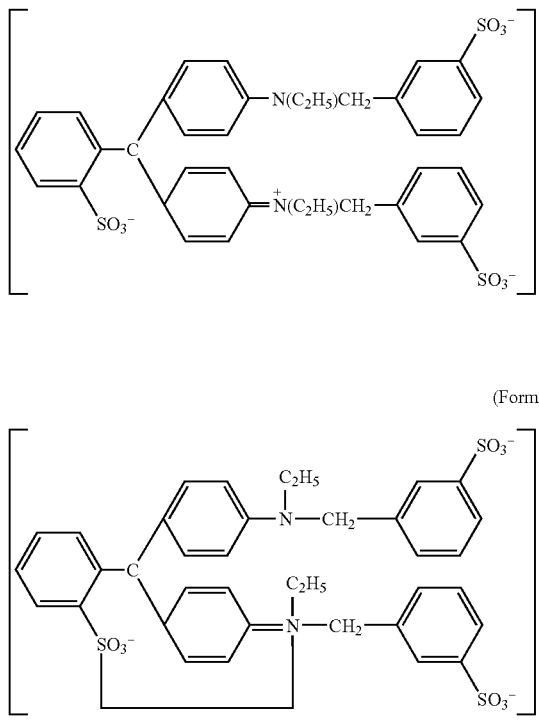

(Formula 1)

(Formula 2)

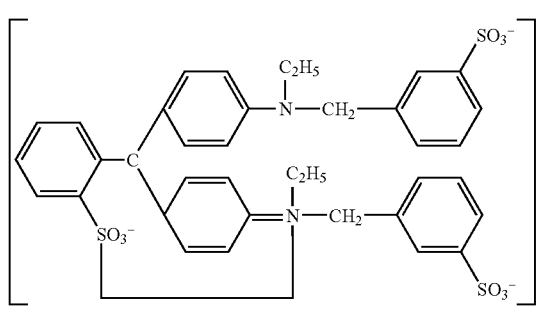

wherein A may be the same or different and is a quaternary ammonium ion group having a saturated hydrocarbon group substituted with a hydroxyl group and being sterically hindered, said dye represented by the chemical structural Formula 1 or 2 is compatible with the other ingredients in said ink composition, and said ink composition has a low temperature aging stability.

8. The ballpoint pen ink composition according to claim 7, wherein said coloring materials consist essentially of a combination of an anthraquinone-based pigment, at least one dye represented by the following Formula 1 or 2, and a xanthene dye.

9. A ballpoint pen ink composition comprising coloring materials, a resin, and a non-aqueous solvent comprising 3-methoxy-3-methyl-1-butanol, said coloring materials comprising a combination of an anthraquinone-based pigment, at least one dye represented by Formula 1 or 2, and a phthalein dye and being free of a metal complex salt dye, wherein 3-methoxy-3-methyl-1-butanol is 40 mass % or more of the entire solvent, said dye represented by the following Formula 1 or 2 dissolving in the non-aqueous solvent to a concentration of at least 30 mass %, said resin comprising polyvinylbutyral:

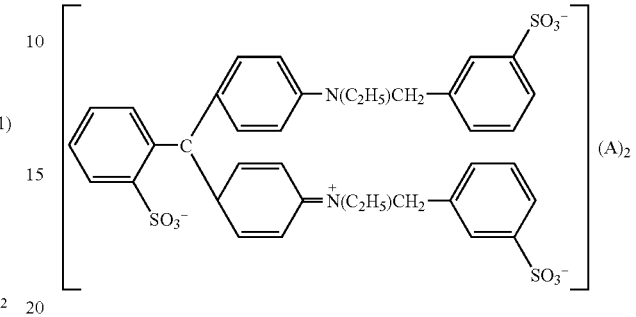

(Formula 1)

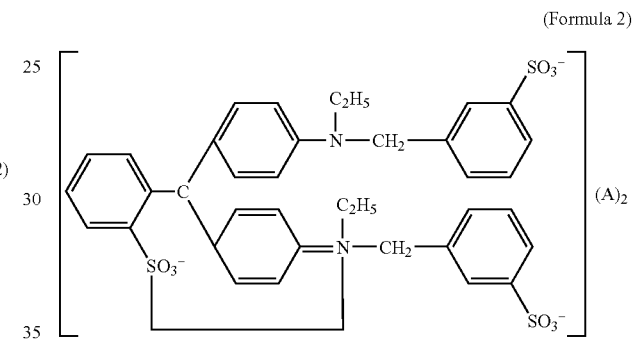

(Formula 2)

wherein A may be the same or different and is a quaternary ammonium ion group having a saturated hydrocarbon group substituted with a hydroxyl group and being sterically hindered, said dye represented by the chemical structural Formula 1 or 2 is compatible with the other ingredients in said ink composition, and said ink composition has a low temperature aging stability.

10. The ballpoint pen ink composition according to claim 9, wherein said coloring materials consist essentially of a combination of an anthraquinone-based pigment, at least one dye represented by Formula 1 or 2, and a phthalein dye.

11. A sign pen comprising an oil-based ink composition, said ink composition comprising coloring materials, a resin, and a non-aqueous solvent comprising 3-methoxy-3-methyl-1-butanol, said coloring materials comprising a combination of an anthraquinone-based pigment and at least one dye represented by the following Formulas 1 or 2 and being free of a metal complex salt dye, said anthraquinone-based pigment having an average particle size of 30-700 nm and occupying 0.5-25 mass % based on the ink composition, wherein 3-methoxy-3-methyl-1-butanol is 40 mass % or more of the entire solvent, said dye dissolving in the said non-aqueous solvent to a concentration of at least 20 mass %,

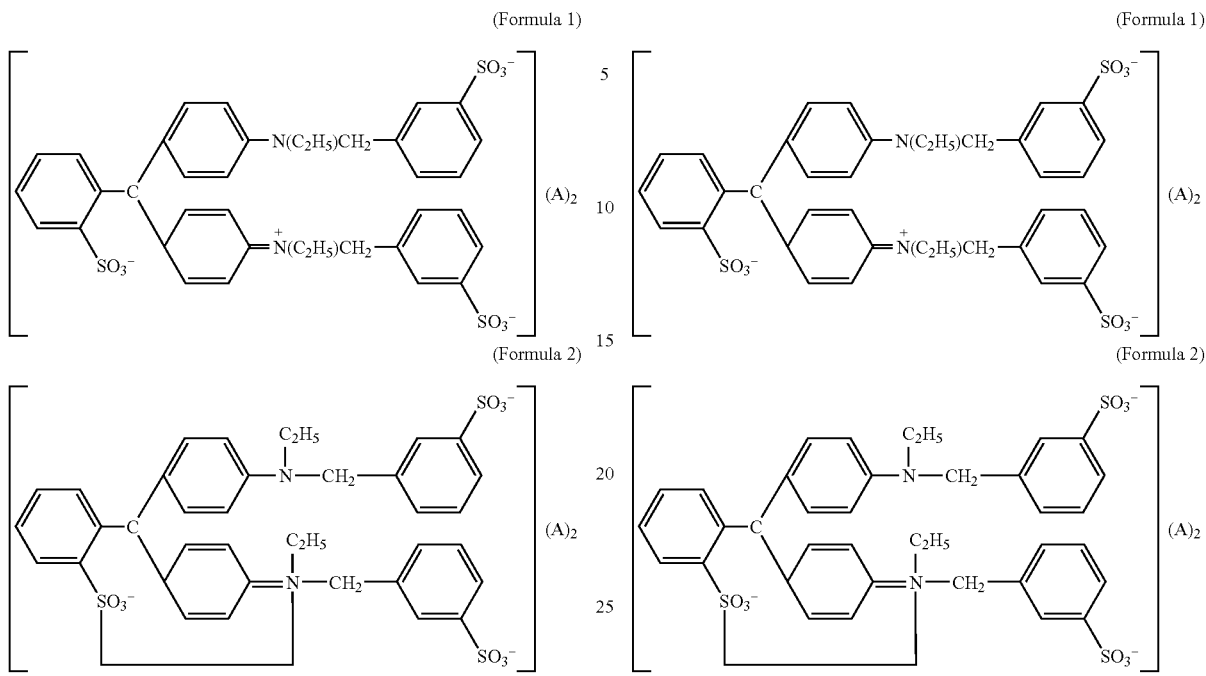

wherein A may be the same or different and is a quaternary ammonium ion group having a saturated hydrocarbon group substituted with a hydroxyl group and being sterically hindered, said dye represented by the chemical structural Formula 1 or 2 is compatible with the other ingredients in said ink composition, and said ink composition has a low temperature aging stability.

12. An ink stamp pad comprising an oil-based ink composition, said ink composition comprising coloring materials, and a resin, and a non-aqueous solvent comprising 3-methoxy-3-methyl-1-butanol, said coloring materials comprising a combination of an anthraquinone-based pigment and at least one dye represented by the following Formulas 1 or 2 and being free of a metal complex salt dye, said anthraquinone-based pigment having an average particle size of 30-700 nm and occupying 0.5-25 mass % based on the ink composition, wherein 3-methoxy-3-methyl-1-butanol is 40 mass % or more of the entire solvent, said dye dissolving in the said non-aqueous solvent to a concentration of at least 20 mass %, wherein A may be the same or different and is a quaternary ammonium ion group having a saturated hydrocarbon group substituted with a hydroxyl group and being sterically hindered, said dye represented by the chemical structural Formula 1 or 2 is compatible with the other ingredients in said ink composition, and said ink composition has a low temperature aging stability.

13. A ballpoint pen comprising the ballpoint pen ink composition according to claim 1.
14. A ballpoint pen comprising the ballpoint pen ink composition according to claim 2.
15. A ballpoint pen comprising the ballpoint pen ink composition according to claim 3.
16. A ballpoint pen comprising the ballpoint pen ink composition according to claim 4.
17. A ballpoint pen comprising the ballpoint pen ink composition according to claim 5.
18. A ballpoint pen comprising the ballpoint pen ink composition according to claim 6.
19. A ballpoint pen comprising the ballpoint pen ink composition according to claim 8.
20. A ballpoint pen comprising the ballpoint pen ink composition according to claim 8.
21. A ballpoint pen comprising the ballpoint pen ink composition according to claim 9.
22. A ballpoint pen comprising the ballpoint pen ink composition according to claim 10.

* * * * *